United States Patent
Walker et al.

(10) Patent No.: US 11,148,720 B2
(45) Date of Patent: Oct. 19, 2021

(54) BARRIER ASSEMBLY FOR AN ENERGY STORAGE SYSTEM AND A VEHICLE THAT UTILIZES THE BARRIER ASSEMBLY

(71) Applicant: GM GLOBAL TECHNOLOGY OPERATIONS LLC, Detroit, MI (US)

(72) Inventors: Travis W. Walker, Rochester Hills, MI (US); Robert N. Saje, Shelby Township, MI (US); Eric A. Mathieson, Rochester, MI (US); Michael T. Chaney, Macomb, MI (US); Warren J. Parsons, Oakland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 141 days.

(21) Appl. No.: 16/788,854

(22) Filed: Feb. 12, 2020

(65) Prior Publication Data
US 2021/0245810 A1 Aug. 12, 2021

(51) Int. Cl.
*B60J 7/00* (2006.01)
*B62D 21/15* (2006.01)
*B60K 1/04* (2019.01)
*B62D 21/02* (2006.01)

(52) U.S. Cl.
CPC ............... *B62D 21/15* (2013.01); *B60K 1/04* (2013.01); *B62D 21/02* (2013.01); *B60Y 2306/01* (2013.01)

(58) Field of Classification Search
CPC ....... H01L 2924/00; H01L 2224/45015; H01L 2924/00014; H01L 2224/743; C08F 110/06; G01C 21/26; H04Q 11/0478; C12Q 1/6811; G06F 5/14
See application file for complete search history.

(56) References Cited

U.S. PATENT DOCUMENTS

| | | | | |
|---|---|---|---|---|
| 9,545,952 B2* | 1/2017 | Sakaguchi | ........... | B62D 21/157 |
| 9,809,101 B2* | 11/2017 | Ikeda | ................. | B62D 25/2036 |
| 9,821,854 B2* | 11/2017 | Bach | .................... | B62D 25/025 |
| 10,370,040 B1* | 8/2019 | Cooper | ................ | B62D 21/157 |
| 10,633,029 B1* | 4/2020 | Nusier | ................ | B62D 25/025 |
| 10,919,577 B2* | 2/2021 | Douglas | ............... | B62D 25/025 |
| 11,040,740 B2* | 6/2021 | Grottke | ............. | B62D 25/2036 |
| 2012/0086238 A1* | 4/2012 | Tan | ...................... | B62D 25/025 |
| | | | | 296/209 |

(Continued)

*Primary Examiner* — Kiran B Patel
(74) *Attorney, Agent, or Firm* — Quinn IP Law

(57) ABSTRACT

A barrier assembly for an energy storage system includes a panel and an energy storage pack. The panel includes an outer surface and an inner surface opposing the outer surface. The energy storage pack is spaced from the panel relative to the inner surface of the panel. The barrier assembly further includes an intermediate structure disposed between the inner surface of the panel and the energy storage pack. The intermediate structure is configured to absorb energy when a load is applied to the outer surface of the panel and configured to redistribute the load along a plurality of load paths through the intermediate structure as the load is applied to the panel. A vehicle includes the barrier assembly discussed above. The vehicle includes a support structure and the barrier assembly is coupled to the support structure. The inner surface of the panel faces toward the support structure.

20 Claims, 3 Drawing Sheets

(56) References Cited

U.S. PATENT DOCUMENTS

| | | | |
|---|---|---|---|
| 2016/0114667 A1* | 4/2016 | Ikeda | B60L 50/71 |
| | | | 180/68.5 |
| 2017/0305249 A1* | 10/2017 | Hara | H01M 50/20 |
| 2017/0305251 A1* | 10/2017 | Hara | H01M 50/20 |
| 2018/0304932 A1* | 10/2018 | Cooper | B62D 29/005 |
| 2018/0370570 A1* | 12/2018 | Ayukawa | B62D 25/2036 |
| 2018/0370573 A1* | 12/2018 | Yang | B62D 25/025 |
| 2019/0118868 A1* | 4/2019 | Kellner | B62D 21/157 |
| 2020/0227705 A1* | 7/2020 | Grace | B60L 3/0007 |
| 2020/0353984 A1* | 11/2020 | Newcomb | B62D 25/08 |
| 2021/0179179 A1* | 6/2021 | Butukuri | B62D 21/157 |
| 2021/0221436 A1* | 7/2021 | Tsuyuzaki | B62D 21/157 |
| 2021/0226188 A1* | 7/2021 | Syed | B60L 50/64 |

* cited by examiner

BARRIER ASSEMBLY FOR AN ENERGY STORAGE SYSTEM AND A VEHICLE THAT UTILIZES THE BARRIER ASSEMBLY

INTRODUCTION

An electric or hybrid vehicle includes one or more electric machines powered via an energy storage system. The electric machine(s) may operate various components of the vehicle. For example, the electric machine may drive one or more axles of the vehicle.

The energy storage system is housed within the vehicle. The energy storage system may include a battery pack that is supported via a tray. The tray may be fixed to a frame of the vehicle.

SUMMARY

The present disclosure provides a barrier assembly for an energy storage system. The barrier assembly includes a panel and an energy storage pack. The panel includes an outer surface and an inner surface opposing the outer surface. The energy storage pack is spaced from the panel relative to the inner surface of the panel. The barrier assembly further includes an intermediate structure disposed between the inner surface of the panel and the energy storage pack. The intermediate structure is configured to absorb energy when a load is applied to the outer surface of the panel and configured to redistribute the load along a plurality of load paths through the intermediate structure as the load is applied to the outer surface of the panel.

In one aspect, the intermediate structure includes a first component and a second component adjacent to each other. In certain configurations, the first component is disposed between the panel and the second component. Furthermore, in certain configurations, the second component is disposed between the first component and the energy storage pack.

In certain configurations, the load paths include a first load path and a second load path spaced from the first load path. In one aspect, the first component includes a first configuration that is configured to redistribute the load along the load paths. In certain configurations, the first component includes the first configuration that is configured to redistribute the load along the first load path and the second load path. In further aspects, the second component includes a second configuration different from the first configuration. The second configuration is configured to redistribute a secondary load in response to a force applied to the second component via the first component due to the load applied to the outer surface of the panel.

In another aspect, the first component defines a pocket. In certain configurations, the first component is compressible relative to the pocket which causes the pocket to change configuration and absorb energy in response to the load applied to the outer surface of the panel.

In further aspects, the first component includes a first side and a second side spaced from each other. In certain configurations, the first component includes the first side and the second side spaced from the first side relative to a first axis. In one aspect, the pocket is disposed between the first and second sides of the first component.

In certain configurations, the first axis crosses the first and second components and the energy storage pack. In another configuration, the first axis crosses the first and second components, the panel, and the energy storage pack.

In certain configurations, the second component includes a first side and a second side that opposes the first side of the second component. In one aspect, at least part of the first side of the second component faces the energy storage pack and at least part of the second side of the second component faces the first component.

In another aspect, the second component defines a channel open relative to the first side of the second component and/or the second side of the second component. In certain configurations, the second component is deformable relative to the channel in response to the force applied thereto from the first component. In another configuration, the second component is deformable relative to the channel in response to the force applied to the second component via the first component due to the load applied to the outer surface of the panel.

In yet another aspect, the first component includes a rigid structure that defines a plurality of pockets spaced from each other. In certain configurations, the rigid structure is compressible relative to at least one of the pockets to absorb energy in response to the load applied to the outer surface of the panel.

In one aspect, the rigid structure closes the pockets along the first and second sides of the first component relative to the first axis. In certain configurations, the rigid structure completely surrounds each of the pockets relative to the first axis.

In another aspect, the first component includes a first side and a second side opposing the first side of the first component. In certain configurations, the rigid structure partially surrounds each of the pockets such that the pockets are open relative to the first side of the first component and/or relative to the second side of the first component. In yet another aspect, at least part of the first side of the second component faces the energy storage pack and at least part of the second side of the second component faces the first component.

According to further aspects, the second component defines a plurality of channels open relative to the first side of the second component and/or the second side of the second component. In certain configurations, the second component is deformable relative to at least one of the channels to redistribute the secondary load in response to the force applied to the second component via the first component.

In another aspect, the first component includes a first side edge that connects the first and second sides of the first component. Additionally, in yet another aspect, the first component includes a second side edge spaced from the first side edge, and the second side edge connects the first and second sides of the first component. Furthermore, in certain configurations, the first and second sides of the first component and the first and second side edges of the first component cooperate to present an outer periphery. In yet another aspect, each of the pockets are surrounded by the outer periphery of the first component. In certain configurations, the first side edge presents one of the load paths and the second side edge presents another one of the load paths.

According to further aspects, the first component includes a first end portion, a second end portion spaced from the first end portion, and a middle portion disposed between the first and second end portions. In certain configurations, the first end portion, the second end portion, and/or the middle portion presents one or more of the load paths.

In one aspect, the first component includes a first wall segment disposed between the first and second sides of the first component. Furthermore, in one aspect, the first component includes a second wall segment spaced from the first wall segment and disposed between the first and second sides of the first component. In yet another aspect, the first wall segment is disposed along the first end portion and the second wall segment is disposed along the second end portion.

In certain configurations, the load paths include a first load path and a second load path. In another aspect, the first wall segment presents the first load path and the second wall segment presents the second load path. In certain configurations, the load paths include a third load path.

In yet another aspect, the middle portion of the first component includes a third wall segment disposed between the first and second sides of the first component. In certain configurations, the third wall segment is disposed between the first and second wall segments. In further aspects, the third wall segment presents the third load path.

According to another aspect, a barrier wall is disposed between the energy storage pack and the intermediate structure to separate the energy storage pack from the intermediate structure.

In one aspect, a fastener is attached to the panel and the second component. In another aspect, the first component includes a flange spaced from the fastener and at least partially aligns with the fastener. In certain configurations, the first component is movable between an initial position and a final position relative to a direction of the load in which the flange moves toward the fastener such that the flange applies a force to the fastener which shears the fastener from the second component.

The present disclosure also provides a vehicle that includes the barrier assembly discussed above. The vehicle includes a support structure and the barrier assembly is coupled to the support structure. The inner surface of the panel faces toward the support structure.

In one aspect, the intermediate structure includes a first component and a second component adjacent to each other. The first component is disposed between the panel and the second component. The second component is disposed between the first component and the energy storage pack.

In certain configurations, the load paths include a first load path and a second load path spaced from the first load path. In certain aspects, the first component includes a first configuration that is configured to redistribute the load along the first load path and the second load path, and the second component includes a second configuration different from the first configuration. The second configuration is configured to redistribute a secondary load in response to a force applied to the second component via the first component due to the load applied to the outer surface of the panel.

In yet another aspect, the support structure includes a cross beam spaced from the panel relative to the inner surface of the panel. The second component redistributes the secondary load along the cross beam in response to the force applied to the second component via the first component.

The detailed description and the drawings or FIGS. are supportive and descriptive of the disclosure, but the claim scope of the disclosure is defined solely by the claims. While some of the best modes and other configurations for carrying out the claims have been described in detail, various alternative designs and configurations exist for practicing the disclosure defined in the appended claims.

DETAILED DESCRIPTION

Those having ordinary skill in the art will recognize that all directional references (e.g., above, below, upward, up, downward, down, top, bottom, left, right, vertical, horizontal, etc.) are used descriptively for the FIGS. to aid the reader's understanding, and do not represent limitations (for example, to the position, orientation, or use, etc.) on the scope of the disclosure, as defined by the appended claims. Furthermore, the term "substantially" can refer to a slight imprecision or slight variance of a condition, quantity, value, or dimension, etc., some of which that are within manufacturing variance or tolerance ranges. The phrase "at least one of" as used herein should be construed to include the non-exclusive logical "or", i.e., A and/or B and so on depending on the number of components.

Figure 1:
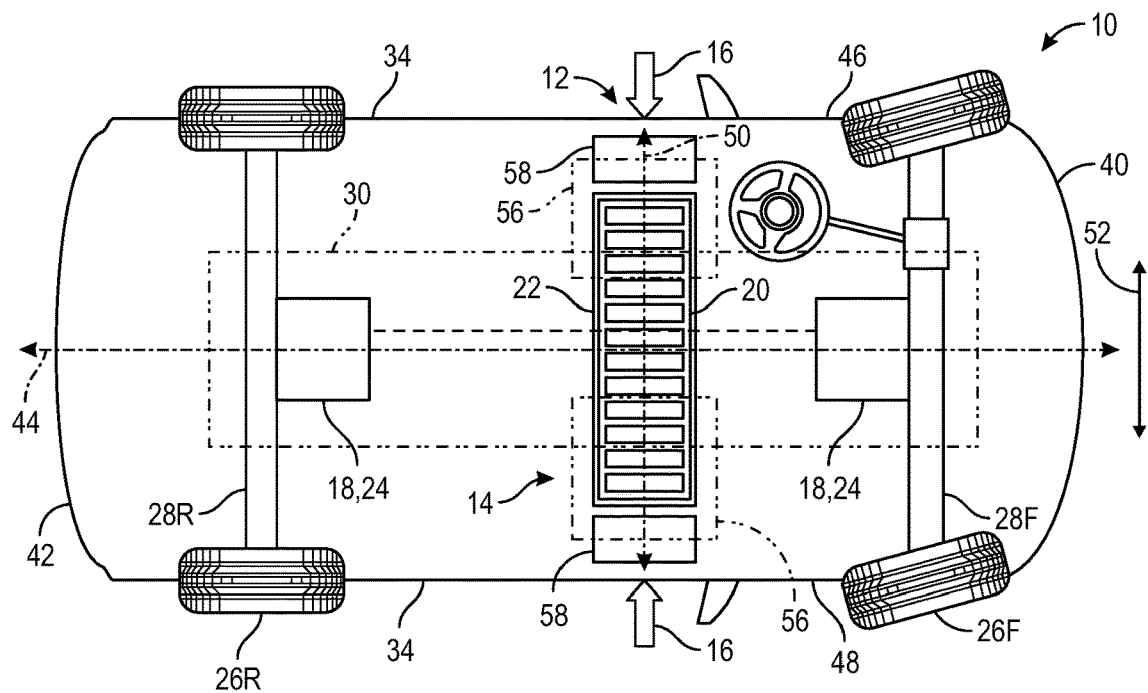
FIG. 1 is a schematic illustration of a vehicle and a barrier assembly.

Referring to the FIGS., wherein like numerals indicate like or corresponding parts throughout the several views, a movable platform, such as a vehicle 10 is generally shown in FIG. 1. A barrier assembly 12 for an energy storage system 14 is also generally shown in FIG. 1. The barrier assembly 12 may be utilized in the movable platform. The barrier assembly 12 is used to absorb energy and redistribute or redirect a load 16 into certain structures to improve rigidity around the energy storage system 14, which will be discussed further below.

The movable platform may include an electric powertrain 18 and the energy storage system 14, which may be a multi-pack energy storage system. In the example configuration of FIG. 1, the electric powertrain 18 powers electric propulsion functions of the movable platform, which is a motor vehicle in FIG. 1. Non-limiting examples of the vehicle 10 may include a car, a truck, a motorcycle, an off-road vehicle, a farm vehicle, a watercraft, an aircraft, rail vehicles, or any other suitable movable platform. It is to be appreciated that alternatively, a non-vehicle application may be used, such as, farm equipment, stationary platforms, stationary or mobile power plants, robots, conveyors, transport platforms, etc.

The energy storage system 14 described herein may be used in rechargeable electrical systems for vehicle or non-vehicle applications. For illustrative purposes, the movable platform of FIG. 1 will be described hereinafter in the context of a motor vehicle without limiting the present teachings to vehicle applications in general.

Continuing with FIG. 1, the energy storage system 14 may include an energy storage pack 20 disposed within a storage compartment 22 adjacent the frame, and the energy storage pack 20 may be configured to provide motive power to the electric powertrain 18. The energy storage pack 20 may include any suitable structures, compositions, materials, elements, etc., to power and recharge various components, such as the electric powertrain 18, one or more electric machines 24, etc. As non-limiting examples, the energy storage pack 20 may include components/structures/compositions/materials/elements to form batteries, gas storage, such as hydrogen storage, oxygen storage, etc., or any other energy storage components/structures to power and recharge various components of the vehicle 10. The energy storage pack 20 may include one or more lithium-ion electrochemical cells, zinc-air, nickel-metal hydride, lead acid, or other application-suitable battery chemistry, to selectively recharge the energy storage pack 20. For example, the energy storage pack 20 may be a secondary or rechargeable energy storage configured to convert energy and provide power to the electric powertrain 18 of the vehicle 10. In one example, the energy storage system 14 may provide power to one or more electric machines 24, such as an electric traction motor. In another example, the energy storage system 14 may provide power to electronic components of the movable platform.

Therefore, the energy storage system 14 may be useful for automotive applications, such as for example vehicles 10 that are: plug-in hybrid electric vehicles (PHEV), hybrid electric vehicles (HEV), battery electric vehicles (BEV), all-electric vehicles (AEV), fuel-cell electric vehicles (FCEV), hydrogen powered vehicles, etc. Further, optionally, one or more secondary energy storage modules may be combined to form a secondary energy storage pack. By way of example, the energy storage system 14 may be sufficiently sized to provide sufficient voltage for powering vehicles 10 that are: PHEV, HEV, BEV, AEV, hydrogen powered vehicles, and the like, e.g., approximately to volts or more, depending on the required application.

Again continuing with FIG. 1, the movable platform may include front and rear wheels 26F, 26R, respectively. The front and rear wheels 26F, 26R may be connected to separate front and rear drive axles 28F, 28R. In an all-wheel drive (AWD) configuration, the drive axles 28F, 28R may be individually powered by separate rotary electric machines 24 each functioning as electric traction motors via corresponding power inverter module. When the movable platform is in operation, modulated switching control is performed by a controller via control signals to ultimately energize one or more of the electric machines 24 to generate and deliver motor torque to one or more of the road wheels 26F, 26R, and to thereby propel the movable platform and/or to perform other useful work. Thus, the energy storage pack 20 and the controller together form the energy storage system 14, with other possible components such as thermal management/cooling and power electronic hardware.

A support structure 30 (see FIG. 1) may be used to support various components of the barrier assembly 12 and/or the vehicle 10. The support structure 30 is shown schematically in phantom lines in FIG. 1 for illustrative purposes. For example, the support structure 30 may be a frame, a cradle, a chassis, a fixture, a beam, a tray, etc. As one example, the support structure 30 may include a cross beam 32 (see FIGS. 2 and 4-6). Generally, the barrier assembly 12 is coupled to the support structure 30, and in certain configurations, coupled to the cross beam 32.

Continuing with FIG. 1, a panel 34 may be used to conceal various components. For example, the panel 34 may be an outer panel of the vehicle 10. The panel 34 includes an outer surface 36 and an inner surface 38 opposing the outer surface 36. The outer surface 36 of the panel 34 is visible outside of the vehicle 10. The inner surface 38 of the panel 34 is concealed behind the outer surface 36, and thus, the inner surface 38 is not visible from outside of the vehicle 10.

Generally, the inner surface 38 of the panel 34 faces toward the support structure 30. That is, the panel 34 may be an outer skin of the vehicle 10.

It is to be appreciated that more than one panel 34 may be used to conceal various components. For example, a plurality of panels 34 (such as side panels, quarter panels, fascia panels, rocker panels 34A, door panels, etc.) may be disposed around the support structure 30 to provide an outer aesthetic appearance to the vehicle 10. The panel 34 of FIGS. 2-6 may be representative of any of the panels relative to the desired location of the barrier assembly 12, but for the below discussion, the rocker panel 34A will be periodically mentioned relative to one example location of the barrier assembly 12 and as identified in FIGS. 2-6.

As shown in FIG. 1, the vehicle 10 may include a front end 40 and a rear end 42 opposing the front end 40 relative to a longitudinal axis 44. Furthermore, the vehicle 10 may include a left side 46 and a right side 48 opposing the left side 46 relative to a first axis 50. The first axis 50 is transverse to the longitudinal axis 44, and in certain configurations, the first axis 50 is perpendicular to the longitudinal axis 44. Generally, the first axis 50 may be in a cross-car orientation; that is, the first axis 50 is in a cross-car direction 52 between the left and right sides 46, 48. More specifically, the first axis 50 may be disposed across the vehicle 10 between the left and right sides 46, 48 of the vehicle 10. As such, the first axis 50 crosses or intersects the left and right sides 46, 48 of the vehicle 10. The first axis 50 is not disposed coaxially or substantially parallel to the longitudinal axis 44 between the front and rear ends 40, 42 of the vehicle 10.

The front end 40, the rear end 42, the left side 46, and the right side 48 cooperate to surround the support structure 30 and the energy storage pack 20. The cross beam 32 may be disposed in the cross-car direction 52, and the cross beam 32 may be spaced from the panel 34 relative to the inner surface 38 of the panel 34. Therefore, in certain configurations, the cross beam 32 may be disposed coaxial or substantially parallel to the first axis 50. It is to be appreciated that a plurality of cross beams 32 may be disposed in the cross-car direction 52.

Doors 54 to enter and exit a passenger compartment of the vehicle 10 are disposed along the left and right sides 46, 48 of the vehicle 10. Inside the passenger compartment may be one or more seats 56 for one or more passengers to sit on. The energy storage pack 20 may be disposed below the passenger compartment, and in certain configurations below one or more of the seats 56, which will be discussed further below.

Generally, some of the panels 34, such as the rocker panels 34A, are disposed along the left and right sides 46, 48 of the vehicle 10. Furthermore, the rocker panels 34A are disposed below the doors 54 relative to a road. That is, the rocker panels 34A are disposed between the doors 54 and the road along the left and right sides 46, 48 of the vehicle 10.

The energy storage pack 20 may be disposed between the rocker panels 34A relative to the left and right sides 46, 48 of the vehicle 10. Additionally, referring to FIGS. 2 and 4-6, the energy storage pack 20 may be disposed below one or more of the seats 56 relative to the road. The energy storage pack 20 is spaced from the panel 34 relative to the inner surface 38 of the panel 34. Therefore, the energy storage pack 20 is not visible from outside of the vehicle 10. That is, the energy storage pack 20 is concealed between the panels 34.

FIGS. 2-6 provide various non-limiting examples of the barrier assembly 12, which will be discussed further below.

The barrier assembly 12 may be disposed along the vehicle 10 in any suitable location. FIG. 1 is illustrative of the barrier assembly 12 being disposed along the left and right sides 46, 48 of the vehicle 10. Generally, the barrier assembly 12 provides various structures that improve rigidity and integrity around the energy storage pack 20. For example, the barrier assembly 12 provides a way to absorb energy to prevent intrusion into the energy storage pack 20 when the load 16 is applied to one or more of the panels 34, such as the rocker panels 34A. Hence, the barrier assembly 12 may provide a more robust rocker design that shields the energy storage pack 20. Furthermore, as another example, the barrier assembly 12 provides a way to redistribute or redirect the load 16 applied to one or more of the panels 34 away from the energy storage pack 20 and/or to one or more structures. Generally, the load 16 is applied to the outer surface 36 of one or more of the panels 34 along the left side 46 and/or the right side 48 of the vehicle 10 (FIG. 1 illustrates example locations of the load 16 applied to the left side 46 and the right side 48 of the vehicle 10).

Turning to FIGS. 2 and 4-6, the barrier assembly 12 includes an intermediate structure 58 that is disposed between the inner surface 38 of the panel 34 and the energy storage pack 20. As one example, the intermediate structure 58 generally reinforces an area along the rocker panels 34A. The rocker panels 34A, i.e., the outer skins, may be configured to absorb energy when the load 16 is applied to the rocker panels 34A. Generally, the intermediate structure 58 is outboard of the energy storage pack 20 to shield the energy storage pack 20 from the load 16. The intermediate structure 58 provides a barrier between the outside of the vehicle 10 and the energy storage pack 20. As such, the intermediate structure 58 is configured to shield the energy storage pack 20 relative to the left and right sides 46, 48 of the vehicle 10. That is, the intermediate structure 58 as illustrated in FIGS. 2-6 may be illustrative of the left side 46 or the right sides 48 of the vehicle 10. The door 54 and the seat 56 may be disposed above the intermediate structure 58. That is, the intermediate structure 58 may be disposed between the road and the door 54 and/or the seat 56.

Continuing with FIGS. 2 and 4-6, a shear structure assembly may be coupled to the barrier assembly 12. The shear structure assembly may include a first shear structure 60 coupled to the intermediate structure 58, and in certain configurations, a second shear structure 62 coupled to the intermediate structure 58. The first and second shear structures 60, 62 are spaced from each other, and each may be attached to the support structure 30. The details of the attachment of the first and second shear structures 60, 62 is discussed further below. Generally, the energy storage pack 20 is disposed between the first and second shear structures 60, 62. That is, the first shear structure 60 may be disposed between the seat 56 and the energy storage pack 20, and the second shear structure 62 may be disposed between the energy storage pack 20 and the road.

The first shear structure 60 and the second shear structure 62 may include a plurality of components or structures, and therefore, the first shear structure 60 may also be referred to as a first shear structure assembly and the second shear structure 62 may also be referred to as a second shear structure assembly.

When using the first shear structure assembly 60, the first shear structure assembly 60 may include an underlying lattice of structural members (non-limiting examples of the structural members may include bars, tubes, plates, strips, beams, etc.) in which the underlying lattice of structural members may be orientated either laterally in the cross-car direction 52 or longitudinally along the longitudinal axis 44, or a combination of the structural members orientated laterally and longitudinally. In certain configurations, the first shear structure assembly 60 may include layers (the order from top, proximal or near the seats 56, to bottom): a panel, the structural members that are orientated laterally in the cross-car direction 52, and then structural members that are orientated longitudinally along the longitudinal axis 44; with the energy storage pack 20 in this configuration disposed below the structural members of the first shear structure assembly 60, and thus, the energy storage page 20 is disposed between the first and second shear structure assemblies 60, 62. It is to be appreciated that the configuration discussed immediately above (the underlying lattice of structural members) may also be used in the second shear structure assembly 60 in the same orientation as discussed above or in the reverse order, i.e., bottom to top). Therefore, the first shear structure assembly 60 and/or the second shear structure assembly 62 may include the structural members orientated laterally and/or longitudinally.

In certain configurations, the first and second shear structures assemblies 60, 62 may each include cross members (non-limiting examples of the cross members may include bars, tubes, plates, strips, beams, etc.) orientated laterally in the cross-car direction 52 without longitudinal cross members. In certain configurations, the first and second shear structure assemblies 60, 62 may each include layers (the order from top, proximal or near the seats 56, to bottom): a panel, the cross members that are orientated laterally in the cross-car direction 52, and then a panel; with the energy storage pack 20 in this configuration disposed between the bottom panel of the first shear structure assembly 60 and the top panel of the second shear structure assembly 62. It is to be appreciated that the first and second shear structure assemblies 60, 62 may be a mixed configuration of the above discussions, where the first shear structure assembly 60 uses the lattice of the structural members and the second shear structure assembly 60 uses the cross members, or vice versa.

The first shear structure 60 may serve as a floorboard of the passenger compartment. The second shear structure 62 may serve as an underbody or cover underneath the energy storage pack 20. In certain configurations, the first shear structure 60 may be referred to as an upper shear panel or plate and the second shear structure 62 may be referred to as a lower shear panel or plate. The first and second shear structures 60, 62 may be any suitable configuration, and non-limiting examples may include one or more outer surfaces of the respective shear structures 60, 62 being flat (shown in solid lines in FIG. 2), curved (shown in phantom lines in FIG. 2), arched, tapered, etc., and combinations thereof. Any of FIGS. 2 and 4-6 may have the various configurations of the first and second shear structures 60, 62.

The intermediate structure 58 is configured to absorb energy when the load 16 is applied to the outer surface 36 of the panel 34 and configured to redistribute the load 16 along a plurality of load paths 64A-E through the intermediate structure 58 as the load 16 is applied to the outer surface 36 of the panel 34. In certain configurations, the load paths 64A-E may include a first load path 64A and a second load path 64B, and in various configurations, the second load path 64B is spaced from the first load path 64A. For example, in certain configurations, the first load path 64A may be directed toward the first shear structure 60 and the second load path 64B directed toward the second shear structure 62. By directing the load 16 to the first and second shear structures 60, 62, the load 16 may be distributed around or away from the energy storage pack 20 instead of into the energy storage pack 20, which again provides a barrier that shields the energy storage pack 20.

Figure 2:
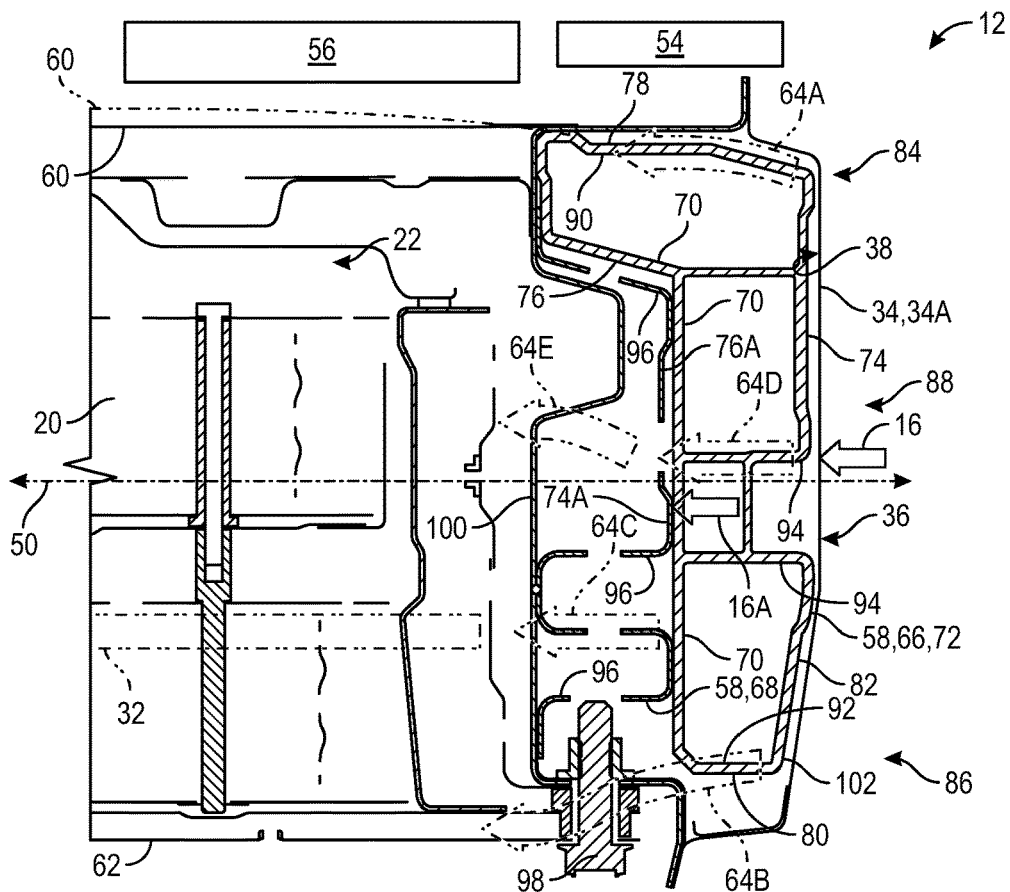
FIG. 2 is a schematic fragmentary cross-sectional view of one example of the barrier assembly that may be used in FIG. 1.
Figure 4:
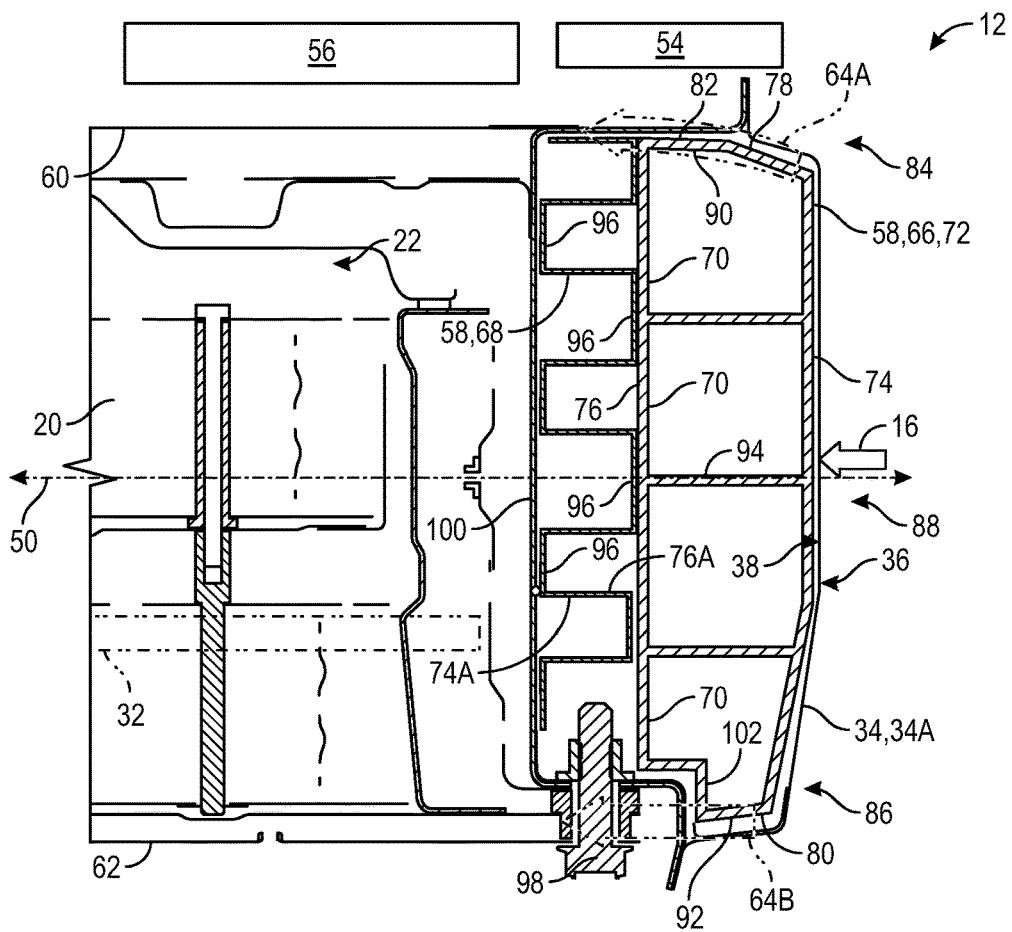
FIG. 4 is a schematic fragmentary cross-sectional view of another example of the barrier assembly that may be used in FIG. 1.
Figure 5:
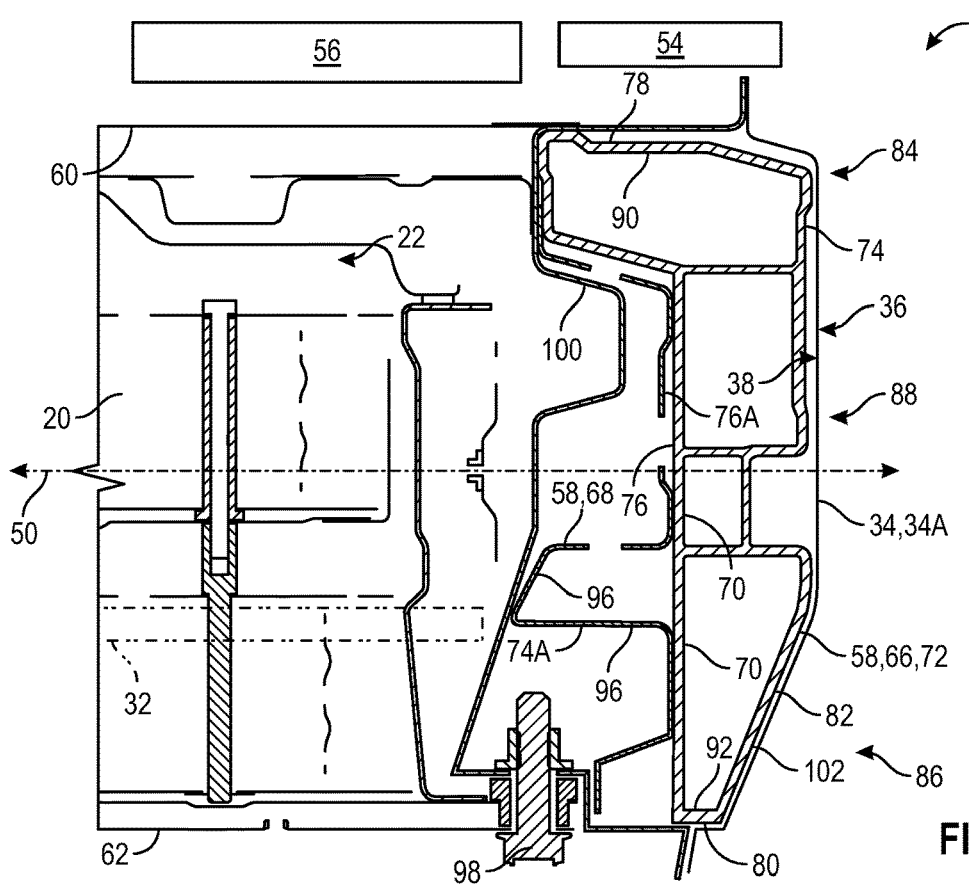
FIG. 5 is a schematic fragmentary cross-sectional view of yet another example of the barrier assembly that may be used in FIG. 1.
Figure 6:
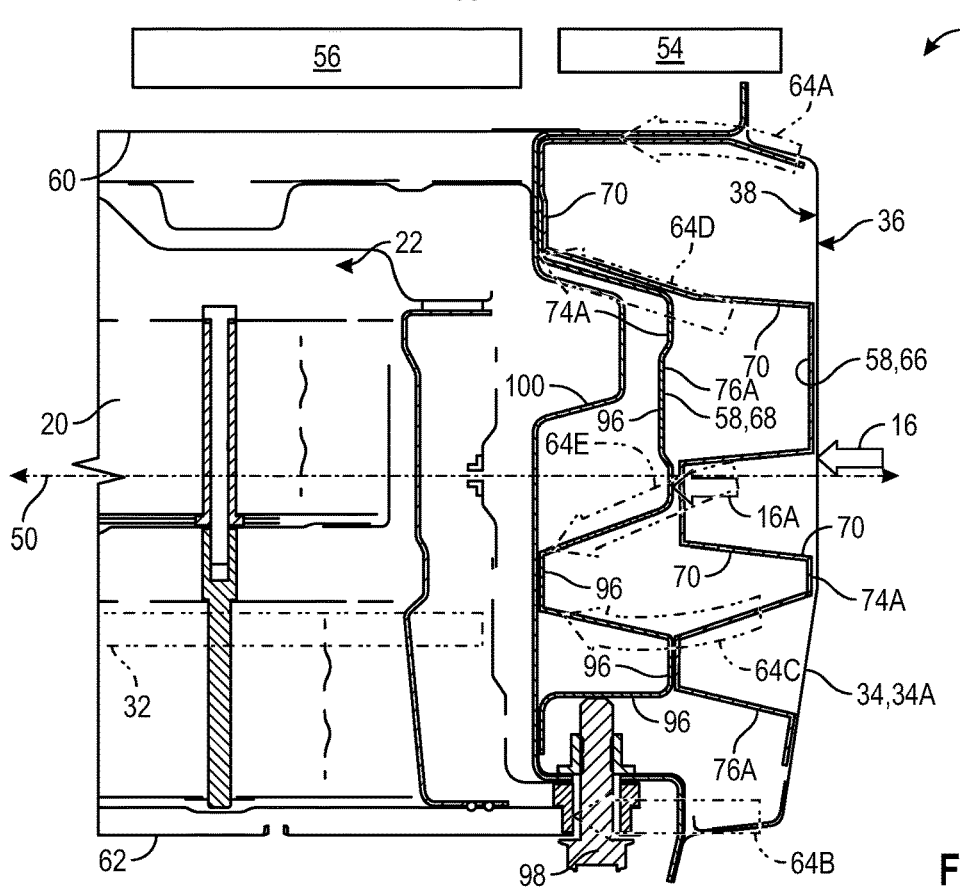
FIG. 6 is a schematic fragmentary cross-sectional view of yet another example of the barrier assembly that may be used in FIG. 1.

Furthermore, more than two load paths 64A, 64B may be formed, and thus, any suitable number of load paths 64A-E may be provided via the intermediate structure 58. As illustrated in FIGS. 2 and 6, there may be more than two load paths 64A, 64B, and thus, the load paths 64A-E may also include a third load path 64C, a fourth load path 64D, and a fifth load path 64E, etc. The load paths 64A-E are shown in phantom lines because the load paths 64A-E may be different than labeled in the FIGS. and identifying the load paths as first, second, third, etc., does not indicate an order of importance. As such, the FIGS. are non-limiting examples. FIG. 5 may have the same load paths 64A-E as FIG. 2 or FIG. 4, and thus, the load paths 64A-E are not duplicated in FIG. 5.

Generally, the load 16 is redistributed to the first and second load paths 64A, 64B, and then from lower load paths (proximate or near the second shear structure 62) toward the top load paths (proximate or near the first shear structure 60). As one non-limiting example, one suitable order of load paths 64A-E will be discussed in this paragraph. Generally, the first desired distribution is the first load path 64A (referred to as the primary load path) that is distributed to the first (upper) shear structure 60 in response to the load 16. The next desired distribution is the second load path 64B that is distributed to the second (lower) shear structure 62 in response to the load 16. Then, the following desired distribution is the third load path 64C that is distributed low under the energy storage pack 20 or toward the cross beam 32 in response to the load 16. Next, the following desired distribution is the fourth load path 64D that is distributed midway of the energy storage pack 20 in response to the load 16. Lastly, the next desired distribution is the fifth load path 64E that is distributed above the cross beam 32 in response to the load 16.

Continuing with FIGS. 2 and 4-6, in various configurations, the intermediate structure 58 includes a first component 66 and a second component 68 adjacent to each other. The first and second components 66, 68 provide different layers to absorb energy and redistribute the load 16 around the energy storage pack 20. Generally, the first component 66 is disposed between the panel 34 and the second component 68. Furthermore, the second component 68 is disposed between the first component 66 and the energy storage pack 20. Therefore, the second component 68 is disposed internally of the first component 66 relative to the first axis 50. The second component 68 is coupled to the first and second shear structures 60, 62 and provides a reaction surface for the first component 66 and the panel 34, 34A. The first component 66 may be referred to as a rocker outer reinforcement component, and the second component 68 may be referred to as a rocker inner reinforcement component. In certain configurations, the first axis 50 crosses the first and second components 66, 68 and the energy storage pack 20. In other configurations, the first axis 50 crosses the first and second components 66, 68, the panel 34, and the energy storage pack 20.

The first and second components 66, 68 cooperate with each other to absorb energy and redistribute the load 16 along the load paths 64A-E. Generally, the load 16 applied to the first component 66 via the panel 34 causes at least part of the first component 66 to move toward the second component 68, and depending on how large the load 16 is, the first component 66 may apply a force to the second component 68 due to the load 16. As such, the load 16 initially applied to the panel 34 may cause both of the first and second components 66, 68 to deform or crush and direct the load 16 (via the load paths 64A-E) to certain structures around the energy storage pack 20 (while minimizing transferring the load 16 (via the load paths 64A-E) to the energy storage pack 20).

Generally, the first component 66 may include a first configuration and the second component 68 may include a second configuration. In certain aspects, the first configuration of the first component 66 is configured to redistribute the load 16 along the load paths 64A-E, such as the first load path 64A and the second load path 64B. Furthermore, in certain aspects, the second configuration of the second component 68 is configured to redistribute a secondary load 16A (along one of the load paths 64C) in response to the force applied to the second component 68 via the first component 66 due to the load 16 applied to the outer surface 36 of the panel 34. Therefore, in certain configurations, the second component 68 may redistribute the secondary load 16A along the cross beam 32 (as shown by the load path 64C) in response to the force applied to the second component 68 via the first component 66. In certain aspects, the second configuration of the second component 68 may be different from the first configuration of the first component 66.

FIGS. 2-6 illustrate some suitable examples of the configurations of the first and second components 66, 68. It is to be appreciated that other configurations are possible even though not illustrated. Some of the details of the first and second components 66, 68 are discussed below.

Referring to FIGS. 2 and 4-6, the first component 66 may define a pocket 70. The first component 66 is compressible relative to the pocket 70 which causes the pocket 70 to change configuration and absorb energy in response to the load 16 applied to the outer surface 36 of the panel 34. In certain configurations, the first component 66 may define a plurality of pockets 70, and at least one of the pockets 70 change configuration when the first component 66 is compressed to absorb energy in response to the load 16. In other configurations, more than one of the pockets 70 or all of the pockets 70 may change configurations in response to the load 16.

Generally, the first component 66 includes a rigid structure 72 that defines one or more of the pockets 70. The rigid structure 72 is configured to maintain its configuration until a large enough load 16 is applied to the first component 66 which causes the rigid structure 72 to deform, compress, etc. to absorb energy and direct the load 16 along the load paths 64A-E.

In certain configurations, the rigid structure 72 defines the pockets 70 spaced from each other. Referring to FIGS. 2 and 4-6, the pockets 70 may be any suitable configuration, and therefore, each of the pockets 70 may be the same size, each of the pockets 70 may be a different size, or some of the pockets 70 may be the same size. The rigid structure 72 is compressible relative to at least one of the pockets 70 to absorb energy in response to the load 16 applied to the outer surface 36 of the panel 34.

The first component 66, which includes the rigid structure 72, may be formed of various materials. Generally, the first component 66 is formed of one or more materials that provide rigidity as well as compressibility and/or deformability when the load 16 is applied to the first component 66 to absorb energy from the load 16. Therefore, the first component 66/the rigid structure 72 may be formed of a metal, an alloy, a composite, or any other suitable material(s) to absorb energy.

In various configurations, the first component 66/the rigid structure 72 is formed of aluminum. When the first component 66 is formed of aluminum, optionally, the first component 66 may be extruded. Therefore, the first component 66 may optionally be formed as an extruded structure to the desired configuration (having one or more of the pockets 70 formed during the process). FIGS. 2 and 4-6 is illustrative of the first component 66 formed via the extruded structure having closed pockets 70. Furthermore, by extruding aluminum to form the first component 66, the walls or structure of the first component 66 may be of different thicknesses. FIGS. 2 and 4 illustrates the first component 66 having walls of different thicknesses for illustrative purposes.

In certain configurations, the first component 66/the rigid structure 72 is formed of steel. When the first component 66 is formed of steel, optionally, the first component 66 may be roll-formed. Therefore, the first component 66 may optionally be formed as a steel sheet that is bent, rolled, contoured to the desired configuration (having one or more of the pockets 70 formed during the process). FIG. 6 is illustrative of the first component 66 formed via the metal sheet that is bent into the desired shape having open pockets 70.

The first component 66 may be various configurations as discussed above, and the above discussed applies to all of the configurations herein. Some non-limiting examples of the different configurations of the first component 66 are discussed below. Referring to FIGS. 2-5, the first component 66 may include a first side 74 and a second side 76 spaced from each other, and in certain configurations, the second side 76 of the first component 66 is spaced from the first side 74 of the first component 66 relative to the first axis 50. In certain aspects, the pocket 70 is disposed between the first and second sides 74, 76 of the first component 66, and more specifically, the pockets 70 are disposed between the first and second sides 74, 76 of the first component 66.

Continuing with FIGS. 2-5, in certain configurations, the first component 66 may include a first side edge 78 that connects the first and second sides 74, 76 of the first component 66. Furthermore, in certain configurations, the first component 66 may include a second side edge 80 spaced from the first side edge 78, and the second side edge 80 connects the first and second sides 74, 76 of the first component 66. Therefore, in certain configurations, the first and second sides 74, 76 of the first component 66 and the first and second side edges 78, 80 of the first component 66 cooperate to present an outer periphery 82. The first side edge 78 may present one of the load paths 64A-E and the second side edge 80 may present another one of the load paths 64A-E.

Continuing with FIGS. 2-5, in certain aspects, the first component 66 may include a first end portion 84, a second end portion 86 spaced from the first end portion 84, and a middle portion 88 disposed between the first and second end portions 84, 86. The first end portion 84, the second end portion 86, and/or the middle portion 88 presents one or more of the load paths 64A-E. The first end portion 84 is disposed closer to the first shear structure 60 than the second end portion 86 is to the first shear structure 60. Furthermore, the second end portion 86 is disposed closer to the second shear structure 62 than the first end portion 84 is to the second shear structure 62. Therefore, in light of the orientation of the first component 66 in FIGS. 2-5, for illustrative purposes, the first end portion 84 may be referred to as an upper portion, and the second end portion 86 may be referred to as a lower portion.

Continuing with FIGS. 2-5, in certain configurations, the first component 66 may include a first wall segment 90 disposed between the first and second sides 74, 76 of the first component 66. Also, in certain configurations, the first component 66 may include a second wall segment 92 spaced from the first wall segment 90 and disposed between the first and second sides 74, 76 of the first component 66. The first wall segment 90 may present the first load path 64A and the second wall segment 92 may present the second load path 64B. In certain configurations, the first wall segment 90 is disposed along the first end portion 84 and the second wall segment 92 is disposed along the second end portion 86.

Referring to FIGS. 2, 4, and 5, the middle portion 88 of the first component 66 may include a third wall segment 94 disposed between the first and second sides 74, 76 of the first component 66. The third wall segment 94 is disposed between the first and second wall segments 90, 92. The third wall segment 94 may present the fourth load path 64D.

The features discussed above for the first component 66 may also be included via the rigid structure 72 of the first component 66. Therefore, the rigid structure 72 may include the first and second sides 74, 76, the first and second side edges 78, 80, the outer periphery 82, the first end portion 84, the second end portion 86, the middle portion 88, the first wall segment 90, the second wall segment 92, and the third wall segment 94, etc.

The pockets 70 may be closed and/or open depending on the desired configuration of the first component 66. The closed pockets 70 will be discussed first with regard to FIGS. 2, 4, and 5, and the open pockets 70 will be discussed with regard to FIG. 6. For example, referring to FIGS. 2, 4, and 5, the rigid structure 72 closes the pockets 70 along the first and second sides 74, 76 of the first component 66 relative to the first axis 50. Therefore, in certain configurations, each of the pockets 70 are surrounded by the outer periphery 82 of the first component 66. In certain configurations, the rigid structure 72 completely surrounds each of the pockets 70 relative to the first axis 50. For example, referring to FIGS. 2, 4, and 5, the first component 66 illustrates four pockets 70 that are closed. Comparing FIG. 4 with FIGS. 2 and 5, the first component 66 illustrates a different configuration of four pockets 70 that are closed. Optionally, with regard to FIGS. 2, 4, and 5, one or more of the pockets 70 may be open at the ends 40, 42 of the first component 66 relative to the front end 40 and rear end 42 of the vehicle 10. In other words, the pockets 70 as illustrated in FIGS. 2, 4, and 5, may be open at the ends 40, 42 going into and out of the page (along the longitudinal axis 44). Furthermore, optionally, with regard to FIGS. 2, 4, and 5, one or more of the pockets 70 may be closed at the ends 40, 42 of the first component 66 relative to the front end 40 and rear end 42 of the vehicle 10.

Now, referring to FIG. 6, the first side 74 of the first component 66 and the second side 76 of the first component 66 oppose each other. The rigid structure 72 partially surrounds each of the pockets 70 such that the pockets 70 are open relative to the first side 74 of the first component 66 and/or relative to the second side 76 of the first component 66. Generally, the first component 66 in this configuration is one or more sheets connected and bent to the desired configuration to form one or more pockets 70 relative to the first side 74 of the first component 66 and the second side 76 of the first component 66. For example, referring to FIG. 6, the first side 74 of the first component 66 illustrates three pockets 70, and the second side 76 of the first component 66 illustrates two pockets 70. The open pockets 70 may be the same size, the open pockets 70 may be different sizes, or some of the open pockets 70 may be the same size.

The second component 68 may be various configurations as discussed above, and the above discussion of the second component 68 applies to all of the configurations herein. The second component 68 may be configured to act as a backstop, and may be configured to absorb energy as well. As such, the second component 68 may be configured to stop the intrusion of the load 16 before reaching the energy storage pack 20. Some non-limiting examples of the different configurations of the second component 68 will be discussed below, and different configurations of the second component 68 are shown in FIGS. 2 and 4-6).

Referring to FIGS. 2-6, the second component 68 may include a first side 74A and a second side 76A opposes the first side 74A of the second component 68. In certain configurations, at least part of the first side 74A of the second component 68 faces the energy storage pack 20 and at least part of the second side 76A of the second component 68 faces the first component 66. In certain aspects, at least part of the second component 68 abuts part of the first component 66.

Continuing with FIGS. 2-6, the second component 68 may define a channel 96 open relative to the first side 74A of the second component 68 and/or the second side 76A of the second component 68. The second component 68 is deformable relative to the channel 96 in response to the force applied thereto from the first component 66. More specifically, the second component 68 is deformable relative to the channel 96 in response to the force applied to the second component 68 via the first component 66 due to the load 16 applied to the outer surface 36 of the panel 34.

In certain configurations, the second component 68 may define a plurality of channels 96 open relative to the first side 74A of the second component 68 and/or the second side 76A of the second component 68. Therefore, in one configuration, one or more channels 96 may be open relative to the first side 74A of the second component 68. In another configuration, one or more of the channels 96 may be open relative to the second side 76A of the second component 68. In yet another configuration, one or more channels 96 are open relative to the first side 74A of the second component 68 and one or more channels 96 are open relative to the second side 76A of the second component 68. The second component 68 may be deformable relative to at least one of the channels 96 to redistribute the secondary load 16A in response to the force applied to the second component 68 via the first component 66.

The second component 68 may be formed of one or more materials that provide rigidity as well as compressibility and/or deformability when the force is applied to the second component 68 from the first component 66. Therefore, the second component 68 may be formed of a metal, an alloy, a composite, or any other suitable material(s) to absorb energy and/or redistribute the secondary load 16A.

Turning to FIGS. 2-6, a fastener 98 may be used to couple various components together. For example, the fastener 98 is attached to the panel 34 and the second component 68. Therefore, the fastener 98 couples together the panel 34 and the second component 68. The fastener 98 may also couple together other components 66, 68, such as the first shear structure 60, the second shear structure 62, and a barrier wall 100 which is discussed further below. It is to be appreciated that a plurality of fasteners 98 may be used.

Figure 3:
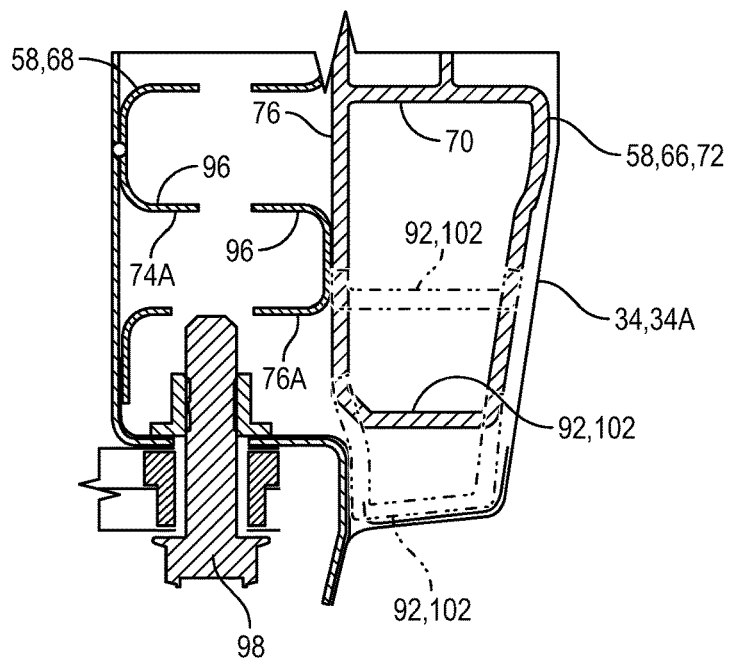
FIG. 3 is a schematic fragmentary illustration of a first component with phantom lines indicating different configurations of the end of the first component adjacent to a fastener.

The barrier assembly 12 may be designed to shear off the fastener 98 in response to the load 16. For example, the first component 66 may include a flange 102 that is positioned relative to the fastener 98 to shear the fastener 98 in response to the load 16. As best shown in FIGS. 3 and 4, the flange 102 may be spaced from the fastener 98 and at least partially aligns with the fastener 98. The first component 66 is movable between an initial position and a final position relative to a direction of the load 16 in which the flange 102 moves toward the fastener 98 such that the flange 102 applies a force to the fastener 98 which shears the fastener 98 from the second component 68. Therefore, if the direction of the load 16 is in the cross-car direction 52, the first component 66 may move generally axially relative to the first axis 50 toward the fastener 98, and the force applied to the fastener 98 may be directly or indirectly via the flange 102. FIG. 3 illustrates different lengths of the flange 102 (and hence, different sizes of one of the pockets 70 at the second end portion 86), some of which are in phantom lines. Therefore, FIG. 3 illustrates two examples of the flange 102 (one in solid lines and one in phantom lines) that at least partially align with the fastener 98 which may cause shearing of the fastener 98.

The barrier assembly 12 may include other components 66, 68, some of which are discussed below. For example, the barrier assembly 12 may include the barrier wall 100 disposed between the energy storage pack 20 and the intermediate structure 58 to separate the energy storage pack 20 from the intermediate structure 58. The barrier wall 100 may also be configured to act as a back-stop and may be configured to absorb energy as well. As such, the barrier wall 100 may be configured to stop the intrusion of the load 16 before reaching the energy storage pack 20. In certain configurations, the barrier wall 100 is attached to the first shear structure 60, and attached to the second shear structure 62 through the fastener 98. The barrier wall 100 and the second component 68 may be attached to each other, and thus, may cooperate to act as the back-stop and/or absorb energy. The barrier wall 100 and the second component 68 also help to maintain the orientation or relationship between the first and second shear structures 60, 62, which helps stabilize ends of the first and second shear structures 60, 62. The second component 68 and the barrier wall 100 cooperate to provide the reaction surface for the first component 66 and the panel 34, 34A. Furthermore, the barrier assembly 12 may include the first and second shear structures 60, 62.

While the best modes and other configurations for carrying out the disclosure have been described in detail, those familiar with the art to which this disclosure relates will recognize various alternative designs and configurations for practicing the disclosure within the scope of the appended claims. Furthermore, the configurations shown in the drawings or the characteristics of various configurations mentioned in the present description are not necessarily to be understood as configurations independent of each other. Rather, it is possible that each of the characteristics described in one of the examples of an configuration can be combined with one or a plurality of other desired characteristics from other configurations, resulting in other configurations not described in words or by reference to the drawings. Accordingly, such other configurations fall within the framework of the scope of the appended claims.

What is claimed is:

1. A barrier assembly for an energy storage system, the barrier assembly comprising:

a panel including an outer surface and an inner surface opposing the outer surface;

an energy storage pack spaced from the panel relative to the inner surface of the panel; and an intermediate structure disposed between the inner surface of the panel and the energy storage pack, and wherein the intermediate structure is configured to absorb energy when a load is applied to the outer surface of the panel and configured to redistribute the load along a plurality of load paths through the intermediate structure as the load is applied to the outer surface of the panel.

2. The assembly as set forth in claim 1 wherein the intermediate structure includes a first component and a second component adjacent to each other, and wherein the first component is disposed between the panel and the second component, and wherein the second component is disposed between the first component and the energy storage pack.

3. The assembly as set forth in claim 2 wherein:
the load paths include a first load path and a second load path spaced from the first load path;
the first component includes a first configuration that is configured to redistribute the load along the first load path and the second load path; and
the second component includes a second configuration different from the first configuration, and the second configuration is configured to redistribute a secondary load in response to a force applied to the second component via the first component due to the load applied to the outer surface of the panel.

4. The assembly as set forth in claim 2 wherein the first component defines a pocket, and the first component is compressible relative to the pocket which causes the pocket to change configuration and absorb energy in response to the load applied to the outer surface of the panel.

5. The assembly as set forth in claim 4 wherein:
the first component includes a first side and a second side spaced from the first side relative to a first axis, and the pocket is disposed between the first and second sides of the first component;
the first axis crosses the first and second components, the panel, and the energy storage pack;
the second component includes a first side and a second side opposes the first side of the second component;
at least part of the first side of the second component faces the energy storage pack and at least part of the second side of the second component faces the first component; and
the second component defines a channel open relative to the first side of the second component and/or the second side of the second component, and the second component is deformable relative to the channel in response to a force applied thereto from the first component.

6. The assembly as set forth in claim 2 wherein the first component includes a rigid structure that defines a plurality of pockets spaced from each other, and the rigid structure is compressible relative to at least one of the pockets to absorb energy in response to the load applied to the outer surface of the panel.

7. The assembly as set forth in claim 6 wherein:
the first component includes a first side and a second side spaced from the first side relative to a first axis;
the first axis crosses the first and second components and the energy storage pack; and
the rigid structure closes the pockets along the first and second sides of the first component relative to the first axis.

8. The assembly as set forth in claim 7 wherein the rigid structure completely surrounds each of the pockets relative to the first axis.

9. The assembly as set forth in claim 6 wherein:
the first component includes a first side and a second side opposing the first side; and
the rigid structure partially surrounds each of the pockets such that the pockets are open relative to the first side of the first component and/or relative to the second side of the first component.

10. The assembly as set forth in claim 9 wherein:
the second component includes a first side and a second side opposes the first side of the second component;
at least part of the first side of the second component faces the energy storage pack and at least part of the second side of the second component faces the first component; and
the second component defines a channel open relative to the first side of the second component and/or the second side of the second component, and the second component is deformable relative to the channel in response to a force applied to the second component via the first component due to the load applied to the outer surface of the panel.

11. The assembly as set forth in claim 6 wherein:
the second component includes a first side and a second side;
the second component defines a plurality of channels open relative to the first side of the second component and/or the second side of the second component; and
the second component is deformable relative to at least one of the channels to redistribute a secondary load in response to a force applied to the second component via the first component.

12. The assembly as set forth in claim 6 wherein:
the first component includes a first side and a second side;
the first component includes a first side edge that connects the first and second sides of the first component;
the first component includes a second side edge spaced from the first side edge, and the second side edge connects the first and second sides of the first component;
the first and second sides of the first component and the first and second side edges of the first component cooperate to present an outer periphery;
each of the pockets are surrounded by the outer periphery of the first component; and
the first side edge presents one of the load paths and the second side edge presents another one of the load paths.

13. The assembly as set forth in claim 2 wherein the first component includes a first end portion, a second end portion spaced from the first end portion, and a middle portion disposed between the first and second end portions, and wherein the first end portion, the second end portion, and/or the middle portion presents one or more of the load paths.

14. The assembly as set forth in claim 13 wherein:
the load paths include a first load path and a second load path;
the first component includes a first side and a second side spaced from each other;
the first component includes a first wall segment disposed between the first and second sides of the first component;
the first component includes a second wall segment spaced from the first wall segment and disposed between the first and second sides of the first component; and
the first wall segment presents the first load path and the second wall segment presents the second load path.

15. The assembly as set forth in claim 14 wherein:
the first wall segment is disposed along the first end portion and the second wall segment is disposed along the second end portion;
the load paths include a third load path;
the middle portion of the first component includes a third wall segment disposed between the first and second sides of the first component, and the third wall segment is disposed between the first and second wall segments; and
the third wall segment presents the third load path.

16. The assembly as set forth in claim 1 further including a barrier wall disposed between the energy storage pack and the intermediate structure to separate the energy storage pack from the intermediate structure.

17. The assembly as set forth in claim 1:
wherein the intermediate structure includes a first component and a second component adjacent to each other;
wherein the first component includes a first configuration that is configured to redistribute the load along the load paths;
wherein the second component includes a second configuration different from the first configuration;
further including a fastener attached to the panel and the second component;
wherein the first component includes a flange spaced from the fastener and at least partially aligns with the fastener; and
wherein the first component is movable between an initial position and a final position relative to a direction of the load in which the flange moves toward the fastener such that the flange applies a force to the fastener which shears the fastener from the second component.

18. A vehicle comprising:
a support structure;
a barrier assembly coupled to the support structure, and the barrier assembly includes:
a panel including an outer surface and an inner surface opposing the outer surface, and the inner surface faces toward the support structure;
an energy storage pack spaced from the panel relative to the inner surface of the panel; and
an intermediate structure disposed between the inner surface of the panel and the energy storage pack, and wherein the intermediate structure is configured to absorb energy when a load is applied to the outer surface of the panel and configured to redistribute the load along a plurality of load paths through the intermediate structure as the load is applied to the outer surface of the panel.

19. The vehicle as set forth in claim 18 wherein:
the intermediate structure includes a first component and a second component adjacent to each other, and wherein the first component is disposed between the panel and the second component, and wherein the second component is disposed between the first component and the energy storage pack;
the load paths include a first load path and a second load path spaced from the first load path;
the first component includes a first configuration that is configured to redistribute the load along the first load path and the second load path; and
the second component includes a second configuration different from the first configuration, and the second configuration is configured to redistribute a secondary load in response to a force applied to the second component via the first component due to the load applied to the outer surface of the panel.

20. The vehicle as set forth in claim 19 wherein:
the support structure includes a cross beam spaced from the panel relative to the inner surface of the panel; and
the second component redistributes the secondary load along the cross beam in response to the force applied to the second component via the first component.

* * * * *